UNITED STATES PATENT OFFICE 2,675,375

ARYLAZOPYRIMIDINE COMPOUNDS AND METHODS OF MAKING THE SAME

Harry W. Marson, Greenwich, and Jackson P. English, Stamford, Conn., assignors to American Cyanamid Company, New York, N. Y., a corporation of Maine No Drawing. Application July 14, 1951, Serial No. 236,851

9 Claims. (Cl. 260—154)

This invention relates to certain new 5-phenylazopyrimidines and methods of preparing the same. The new compounds of this invention may be represented by the following structural formula:

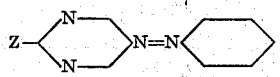

in which Z represents hydrogen or a radical selected from the group consisting of hydrocarbon, amino, substituted amino, sulfhydryl, hydroxy, alkoxy and alkylthio radicals.

The new compounds of this invention are useful in the field of dye chemistry. They may be utilized in the synthesis of certain dyes or they may be employed as pigments themselves. The new compounds may also be of use as intermediates in the synthesis of pharmaceuticals.

The 5-phenylazopyrimidines may be substituted in the 2 position by substituents of any of the types mentioned above. Hydrocarbon radicals with which the 5-phenylazopyrimidines may be suitable substituents in the 2 position may be illustrated by the following: lower alkyl radicals, for instance methyl and butyl, and monocyclic aryl radicals, for instance phenyl. The 5-phenylazopyrimidines may also be substituted in the 2 position by substituted amino groups, for instance methylamino, phenylguanidino, and dimethylamino; alkoxy radicals, for instance methoxy and ethoxy; or alkylthio radicals, for instance methylmercapto and ethylmercapto.

While it is not intended that this invention be limited to the new dyestuffs when produced in any particular manner, a convenient method of preparing the new compounds has been discovered and it is intended that this new method also constitute a part of the invention. The new method comprises reacting a compound having a

group with phenylazomalonaldehyde. This new reaction will be more clearly illustrated by the following equation:

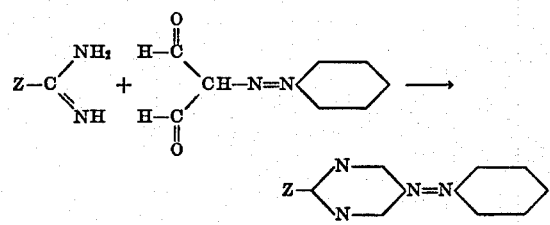

in which Z is as defined above.

Practically any compound having an amidine group is suitable for the process of this invention and the particular compound employed depends upon the 5-phenylazopyrimidine desired. For instance in preparing 2-amino-5-phenylazopyrimidine one will employ guanidine as a reactant and in the preparation of 2 substituted-amino 5-phenylazopyrimidines one will employ a substituted guanidine such as ethyl guanidine as a reactant. Other suitable amidine type compounds which may be employed in the process of this invention may be illustrated by the following: formamidine and acetamidine for preparing compounds of the formula above in which Z represents hydrogen and methyl respectively; isothiourea and S-methylisothiourea for preparing compounds of the above formula in which Z represents sulfhydryl and methylthio respectively; isothiourea and methylisothiourea for preparing compounds in which Z in the above equation represents hydroxy and methoxy respectively. Other suitable amidine type compounds will be, in view of the above, readily apparent to those skilled in the art.

In many instances it will be convenient to employ an acid addition salt of the amidine type compound in place of the free base since the addition salts of these compounds with strong acids are generally more readily available from commercial sources. Such salts may readily be employed by simply treating them with a suitable base to release the free amidine base. As will be obvious to those skilled in the art any base which is stronger than the amidine base may be employed for this purpose. Suitable examples are strongly basic amines for instance piperidine; alkaline earth metal and alkali metal hydroxides, for instance sodium hydroxide; and alcoholates, for instance sodium methoxide and ethyl lithium.

The reaction may be conveniently conducted in an inert solvent and preferably in aqueous solution although organic solvents such as the alcohols, for instance ethyl alcohol and methyl alcohol; glycols, for instance ethylene glycol; and glycol ethers, for instance 2-methoxyethanol, may also be employed. The reaction may be performed over a relatively wide range of temperatures, for instance from room temperature up to 120° C., or even higher. The preferred temperature range is 40° C. to 100° C. The reaction is substantially complete in from 20 to 40 minutes at higher temperatures, i. e., 80° C. and in 24 to 48 hours at lower temperatures, for instance from 25° C. to 35° C.

The invention will be more particularly illustrated by the following specific examples in which all parts are by weight unless otherwise indicated.

EXAMPLE I

*2-amino-5-phenylazopyrimidine*

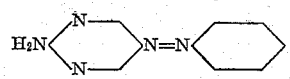

Twenty-two parts of phenylazomalonaldehyde (Claisen, Ber., 36, 3668 (1903)) and twenty-two parts of guanidine hydrochloride are mixed with 350 parts of absolute alcohol and treated with the sodium ethoxide resulting from the solution of eight parts of sodium in 115 parts of absolute alcohol. The mixture is refluxed for one and one-half hours, filtered, and the precipitate washed with water, dilute alkali, and dilute acid. This 2-amino-5-phenylazopyrimidine is further purified by crystallization from methanol.

EXAMPLE II

*2-methylmercapto-5-phenylazopyrimidine*

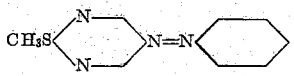

A suspension of 8.8 parts of phenylazomalonaldehyde in 25 parts of water is treated with 5 parts of 10 N sodium hydroxide and 8.1 parts of S-methylisothiourea sulfate and shaken for forty-eight hours. After heating for two hours at 45–50° C. the solid is filtered, extracted with alkali and crystallized from methanol. This 2-methylmercapo-5-phenylazopyrimidine may be further purified by recrystallization from dilute methanol.

Other 5-phenylazopyrimidines are prepared by substituting an equal molar quantity of other amidine type compounds for the S-methylisothiourea in the above example. For instance by substituting an equal molar quantity of acetamidine for the S-methylisothiourea, 2-methyl-5-phenylazopyrimidine is obtained and by substituting an equal molar quantity of ethyl guanidine for the S-methylisothiourea of the above example, 2 - ethyl-amino - 5-phenylazopyrimidine is readily prepared.

EXAMPLE III

*2-3-phenylguanidino)-5-phenylazopyrimidine*

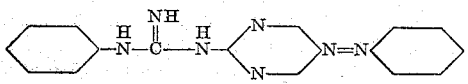

A solution of 7.9 parts of phenylbiguanide hydrochloride in 600 cc. of hot water is added to a slightly alkaline solution of 6.5 parts of phenylazomalonaldehyde in 300 parts of water. The resulting solution is treated with 20 parts of piperidine and allowed to stand for forty-eight hours. The separated solid 2-(3-phenylguanidino)-5-phenylazopyrimidine is collected and crystallized from alcohol.

We claim:

1. The new compounds represented by the formula:

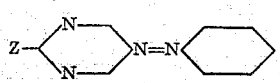

in which Z represents a member selected from the group consisting of hydrogen, lower alkyl radicals, phenyl, amino, lower monoalkyl amino, lower dialkyl amino, lower alkoxy, phenylguanidino, lower alkyl mercapto, hydroxy, and sulfhydryl radicals.

2. 2-(3-phenylguanidino)-5 - phenylazopyrimidine.

3. The compounds represented by the formula:

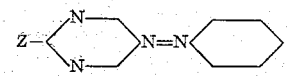

in which Z represents a lower alkylthio radical.

4. 2-methylmercapto-5-phenylazopyrimidine.

5. 2-amino-5-phenylazopyrimidine.

6. A method of preparing compounds represented by the formula:

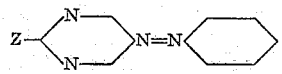

which comprises mixing together in an inert solvent and allowing the mixture to remain at room temperature up to about 120° C. phenylazomalonaldehyde a compound represented by the formula:

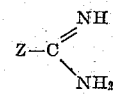

in which Z is a member selected from the group consisting of hydrogen, lower alkyl radicals, phenyl, amino, lower monoalkyl amino, lower dialkyl amino, lower alkoxy, phenylguanidino, lower alkyl mercapto, hydroxy, and sulfhydryl radicals.

7. A method of preparing 2-amino-5-phenylazopyrimidine which comprises mixing together in an inert solvent and allowing the mixture to remain at room temperature up to about 120° C. phenylazomalonaldehyde and guanidine.

8. A method of preparing 2-methylmercapto-5-phenylazopyrimidine which comprises mixing together in an inert solvent and allowing the mixture to remain at room temperature up to about 120° C. S-methylisothiourea and phenylazomalonaldehyde.

9. A method of preparing 2-(3-phenylguanidino)-5-phenylazopyrimidine which comprises mixing together in an inert solvent and allowing the mixture to remain at room temperature up to about 120° C. phenylbiguanide and phenylazomalonaldehyde.

References Cited in the file of this patent

UNITED STATES PATENTS

| Number | Name | Date |
|---|---|---|
| 2,235,638 | Hromatka | Mar. 18, 1941 |
| 2,375,735 | Moos | May 8, 1945 |

OTHER REFERENCES

Lythgoe et al., Jour. Chem. Soc., Part II (1944), pages 31 to 317.

Berichte, article by Claisen, 1903, vol. 36, page 3668.